(12) United States Patent
Dodke

(10) Patent No.: US 8,726,396 B1
(45) Date of Patent: May 13, 2014

(54) SCANNING PROTECTED FILES FOR VIOLATIONS OF A DATA LOSS PREVENTION POLICY

(75) Inventor: Dhananjay Namdeo Dodke, Pune (IN)

(73) Assignee: Symantec Corporation, Mountain View, CA (US)

( * ) Notice: Subject to any disclaimer, the term of this patent is extended or adjusted under 35 U.S.C. 154(b) by 567 days.

(21) Appl. No.: 13/006,853

(22) Filed: Jan. 14, 2011

(51) Int. Cl.
*G06F 7/04* (2006.01)
*G06F 17/00* (2006.01)

(52) U.S. Cl.
USPC ................................................ 726/26; 726/1

(58) Field of Classification Search
USPC ....................................................... 726/26, 1
See application file for complete search history.

(56) References Cited

U.S. PATENT DOCUMENTS

| 5,499,369 | A | 3/1996 | Atkinson |
| 6,519,764 | B1 | 2/2003 | Atkinson et al. |
| 6,971,018 | B1 * | 11/2005 | Witt et al. ................. 713/187 |
| 7,991,747 | B1 * | 8/2011 | Upadhyay et al. ............ 707/674 |
| 8,438,630 | B1 * | 5/2013 | Clifford .......................... 726/13 |
| 2007/0061751 | A1 | 3/2007 | Cory et al. |
| 2012/0324526 | A1 * | 12/2012 | Meyer et al. ..................... 726/1 |

* cited by examiner

*Primary Examiner* — Teshome Hailu
(74) *Attorney, Agent, or Firm* — Lowenstein Sandler LLP

(57) ABSTRACT

A method and apparatus for scanning protected files for violations of a Data Loss Prevention (DLP) policy is described. In one embodiment, a protected file scanning tool monitors protected files in a computing system, and when one of the protected files is created, opened, or saved, the protected file scanning tool obtains a running instance of a data object, corresponding the protected file, from a data store that stores information to track objects that are currently running on the computing system. The protected file scanning tool extracts the decrypted data from the obtained data object, and scans the decrypted data to detect a violation of a DLP policy.

15 Claims, 5 Drawing Sheets

SCANNING PROTECTED FILES FOR VIOLATIONS OF A DATA LOSS PREVENTION POLICY

FIELD OF INVENTION

Embodiments of the invention relate to the field of processing data, and more particularly, to improving data loss prevention (DLP) by scanning protected files.

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Data Loss Prevention (DLP) technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, employees often change their place of employment and may end up moving to a competitor of their former employer. If a new employee possesses knowledge of IP of his or her former employer, this may become a matter of concern for both the former employer and the present employer. For example, if the two competitors are software companies, the former employer has the risk of losing software code developed by a former employee, and the current employer has the risk of being unknowingly liable for IP infringement if the new employee uses the software code developed at the former employer.

Existing DLP technologies cannot scan protected files (e.g., encrypted and/or password-protected files). As such, users can send sensitive data outside their computing system using encrypted or password-protected files. One solution is to block password-protected files to prevent sensitive data loss. However, an entity, such as an enterprise having multiple employees, cannot determine how much sensitive data a user's machine contains unless a DLP discovery system can scan protected files. For example, endpoint users use applications, like Microsoft Office® software products, which provide a mechanism to allow a user to encrypt and protect documents using passwords. So, it is become necessary to add support in a DLP system to scan the encrypted and password-protected Microsoft Office® documents.

Existing security techniques fail to provide efficient solutions that can protect organizations in the situations described above.

SUMMARY OF THE INVENTION

A method and apparatus for scanning protected files for violations of a Data Loss Prevention (DLP) policy. In one exemplary embodiment of a method, a computing system monitors protected files in the computing system, and when one of the protected files is created, opened, or saved, the computing system obtains a running instance of a data object, corresponding to the protected file, from a data store, such as a lookup table that is globally accessible. The protected files may be password-protected files and/or encrypted files. The lookup table stores information to track data objects that include data being actively processed by a currently running application on a computing system. The computing system extracts decrypted data from the obtained data object and scans the decrypted data to detect a violation of a DLP policy.

In another embodiment of the method, the computing system creates a hash of the protected file, and stores the hash and a policy violation status of the protected file. In a further embodiment, the computing system detects a transfer of the protected file, checks the policy violation status of the protected file by comparing the hash of the protected file being transferred with the stored hash of the protected file, and performs an action when the policy violation status indicates that the protected file violates the DLP policy.

In another embodiment of the method, the computing system monitors the file events using a file-system filter driver (or a file-system mini filter driver), and the file events may include one or more of a create file event, an open file event, a write file event, or a close file event. In another embodiment, the computing system detects that an application executing on the computing system has opened, created, or saved the protected files.

In another embodiment of the method, the computing system can track an order in which multiple protected files are opened for obtaining the appropriate running instances of the data objects, corresponding to the protected files from the lookup table. In another embodiment, the computing system creates an inventory of the protected files on the computing system.

In addition, a computer readable storage medium for scanning protected files for violations of the DLP policy is described. An exemplary computer readable storage medium provides instructions, which when executed on a processing system causes the processing system to perform a method such as the exemplary methods discussed above.

Further, systems and apparatus for scanning protected files for violations of the DLP policy are described. An exemplary apparatus may include a data store to store a lookup table that stores information to track objects that are currently running on a computing system, which is coupled to the data store. The computing system may execute a data loss prevention (DLP) agent that may include a file system component, a file monitor component, an extractor component, and a detection component. The file system component is configured to monitor file events on protected files in the computing system. The file events may be, for example, a create file event, an open file event, a close file event, or a write file event. The file monitor component is configured to monitor whether applications executing on the computing system have created, opened, closed, or saved one of the protected files. The extractor component is configured to obtain a running instance of a data object, corresponding to the one protected file, from a lookup table. The lookup table stores information to track objects that are currently running on the computing system. The extractor component is also configured to extract decrypted data from the obtained data object. The detection component is configured to scan the decrypted data to detect a violation of the DLP policy.

In another embodiment, the detection component is configured to scan the decrypted data when the file system component receives a close file event for the protected file. In another embodiment, the file system component includes a file-system filter driver to monitor the file events. In another embodiment, the file system component includes a file-system mini filter driver to monitor the file events. In another embodiment, the file system component is configured to generate a file open event when a user of the computing system creates a new protected file and a file write event when a user of the computing system saves a protected file. In another embodiment, the DLP agent further includes a discovery component to create an inventory of the protected file on the computing system. The discovery component may also be configured to store a hash of the protected file and a policy violation status of the protected file. The discovery component is also used to check the policy violation status when one or more DLP agent hooks or the file-system filter driver (or file-system mini filter driver) detect a transfer of the protected file. The discovery component can check the policy violation status of the protected file by comparing the hash of the protected file being transferred with the stored hash of the protected file.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for scanning protected files for violations of a Data Loss Prevention (DLP) policy. In one embodiment, a protected file scanning tool monitors protected files in a computing system, and when a protected file is created, opened, or saved, the protected file scanning tool obtains a running instance of a data object, corresponding the one protected file, from a lookup table that stores information to track data objects being actively processed by a currently running application on the computing system. The protected file scanning tool extracts the decrypted data from the obtained data object, and scans the decrypted data to detect a violation of a DLP policy.

As described above, existing DLP technologies cannot scan an encrypted and/or protected file, unless the DLP policy is set to block transmission of all protected files. The embodiments described herein allow protected files to be scanned for violations of the DLP policy by extracting decrypted data from an active instance of a data object actively being processed by a currently running application on the computing system, the data object corresponding to the protected file obtained from a lookup table. The embodiments described herein provide an improved DLP system allowing the DLP system to be aware of violations of DLP policies within protected files.

In the following description, numerous details are set forth. It will be apparent, however, to one of ordinary skill in the art having the benefit of this disclosure, that embodiments of the present invention may be practiced without these specific details.

Figure 1:
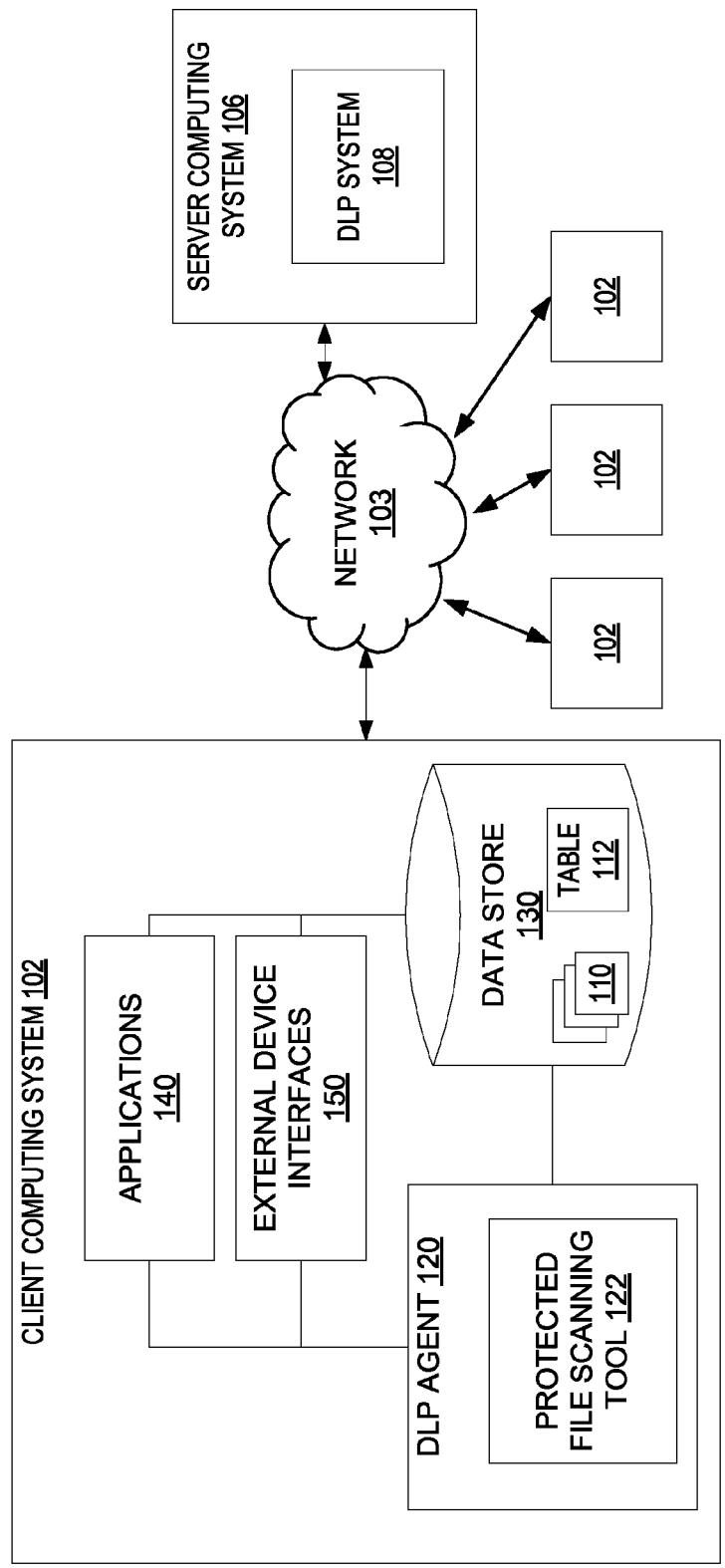
FIG. 1 is a block diagram of exemplary network architecture in which embodiments of the invention may operate.

FIG. 1 is a block diagram of an exemplary network architecture 100 in which embodiments of the invention may operate. The network architecture 100 may include multiple client computing systems 102 and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. The server computing system 106 may host a DLP system 108. In one embodiment, the server computing system 106 may be part of an organization. In another embodiment, a DLP service provider hosts the server computing system 106. The hosted DLP service provider may also have multiple instances of a DLP system on multiple networks that communication with the DLP service provider over a public or private network.

The DLP system 108 may communicate with DLP agents 120 on the client computing systems 102 to perform operations to enforce a DLP policy as described herein. Although only the server computing system 106 is illustrated in FIG. 1, one or more machines may be used for the DLP system 108, including one or more server computers, client computers, gateways or other computing devices. In yet another configuration, the DLP service may reside on a single server, or on different servers, coupled to other devices via a public network (e.g., the Internet) or a private network (e.g., LAN). It should be noted that various other network configurations can be used including, for example, hosted configurations, distributed configurations, centralized configurations, etc.

The depicted client computing system 102, which may operate as an endpoint machine in an enterprise network that uses the DLP system 108 to enforce one or more DLP policies, includes a DLP agent 120 that communicates with the DLP system 108. The DLP agent 120 includes a protected file scanning tool 122. Embodiments of the protected file scanning tool 122 are described below with respect to FIG. 2 and FIG. 3. The client computing system 102 includes applications 140, and external device interfaces 150, as described below with respect to FIG. 2 and FIG. 3, as well as a data store 130 to store data, including protected files 110 and a lookup table 112 that may be globally accessible. The protected files 110 may be password-protected files and/or encrypted files. The protected files 110 may be documents, such as Microsoft Office® documents. For example, Microsoft Office® applications register data objects to be listed in a Running Object Table (ROT) using the Object Linking and Embedding (OLE) technology that allows embedding and linking to document objects and other data objects representing data being actively processed by a currently running application. Alternatively, the protected files may be other types of files than documents as would be appreciated by one of ordinary skill in the art having the benefit of this disclosure. In one embodiment, the protected file scanning tool 122 of the DLP agent 120 scans encrypted and protected Microsoft Office® documents by accessing an active instance of the document's data object from the ROT of the client computing system 102.

It should be noted that protected files are typically encrypted using the password as a key to the encryption algorithm used to encrypt the file. A password is a secret word or string of characters that is used for authentication, to gain access to resource. Thus, a protected file is a file for which a password has been provided to be used for authentication to gain access to the contents of the files. It should be noted that protected files may or may not contain sensitive data that is protected by the DLP policy, but the embodiments described herein provide a tool to scan the protected files for violations of the DLP policy.

More generally, the ROT is a globally accessible lookup table that keeps track of the objects that are actively being processed by a currently running application on the system. In one embodiment, the protected file scanning tool 122 of the DLP agent 120 scans protected files by accessing an active instance of a data object, registered in the lookup table 112. The active instance of the data object is data that is actively being processed by a currently running application in the computing system. The embodiments described herein can access the lookup table to obtain instances of the data objects registered in the lookup table, and extract decrypted data from the data object. The DLP system scans the decrypted data to check for violations of the DLP policy in the protected files 110. Alternatively, the protected files may be other types of documents as would be appreciated by one of ordinary skill in the art having the benefit of this disclosure. The data store 130 may represent a single or multiple data structures (databases, repositories, files, etc.) residing on one or more mass storage devices, such as magnetic or optical storage based disks, tapes or hard drives. The data store 130 can be centralized data repositories that may contain sensitive information in one or more protected and non-protected files as would be appreciated by one of ordinary skill in the art having the benefit of this disclosure. The data store 130 may be, for example, part of a network-attached storage (NAS) system or a storage area network (SAN) system.

Figure 2:
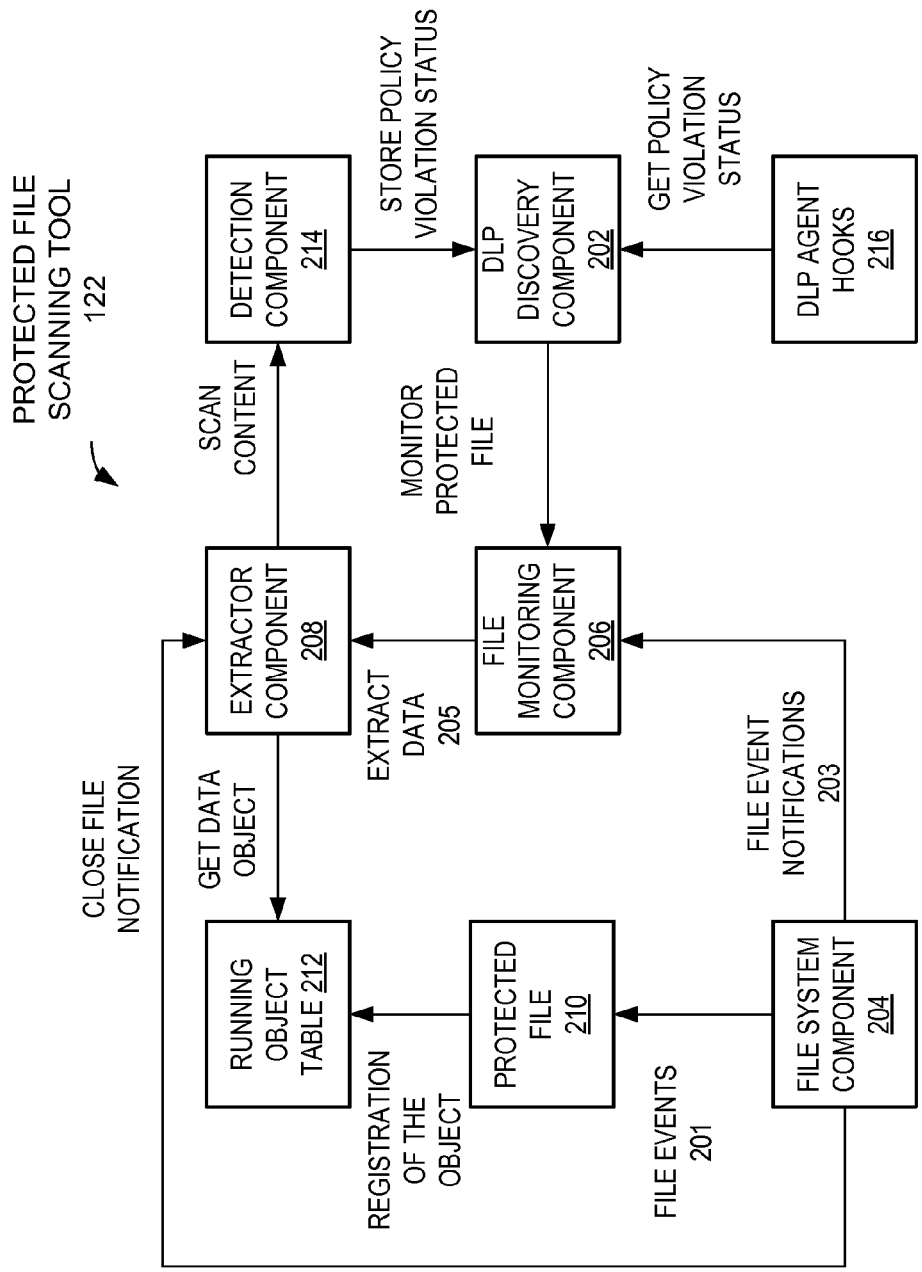
FIG. 2 is a block diagram of one embodiment of a client computing system including a protected file scanning tool.

FIG. 2 is a block diagram of one embodiment of the protected file scanning tool file 122 of the client computing system 102 of FIG. 1. The protected file scanning tool 122 is configured to extract decrypted data by accessing an active instance of the data object from a Running Object Table (ROT) 212 of the client computing system 102 whenever protected files are opened, created, or saved. The ROT 212 tracks data objects that are actively being processed by one or more currently running applications in the client computing system 102. In the depicted embodiment, the protected file scanning tool 122 includes a DLP discovery component 202, a file system component 204, including a file-system filter driver or a file-system mini filter driver (not illustrated in FIG. 2), a file monitoring component 206, an extractor component 208, a detection component 214, and DLP agent hooks 216.

In this embodiment, the DLP discovery component 202 is configured to create an inventory of the protected files 110 on the client computing system 102. The DLP discovery component 202 instructs the file monitoring component 206 to monitor the protected files of the inventory. The file system component 204 is configured to monitor file events 201 on the protected files 110, and to sends file event notifications 203 to the file monitoring component 206 when the certain file events 201 are detected. The file events 201 may be create file events, open file events, write file events, and close file events. In one embodiment, the file system component 204 monitors multiple open/write/close events on the Microsoft Office® documents using the file-system filter driver. Alternatively, the file system component 204 can monitor file events using other techniques as would be appreciated by one of ordinary skill in the art having the benefit of this disclosure.

In one embodiment, the file monitoring component 206 is configured to monitor whether applications 140 (illustrated in FIG. 1) (e.g., Microsoft Office® applications) have opened any protected file. The file monitoring component 206 sends an extract data command 205 to the extractor component 208 to obtain and extract a data object in the ROT 212 corresponding to the protected file 210. In another embodiment, when a user of the client computing system 102 modifies and saves the protected file (e.g., one type of the file events 201), the file system component 204 sends a file event notification 203, such as a write event, to the file monitoring component 206. Like when a protected file is opened, the file monitoring component 206 instructs the extractor components 208 to obtain the decrypted data from the running instance of the corresponding data object from the ROT 212 when the protected file is modified and saved.

When the file system component 204 receives a close file event for the monitored protected file, the detection component 214 is configured to scan the extracted decrypted data to check for violations of a DLP policy. In another embodiment, the detection component 214 can scan the extracted decrypted data according to other conditions, instead of in response to the close file event, such as, for example, upon opening and closing the file, and/or periodically while the protected file is open in the application.

In one embodiment, the discovery component 202 is configured to create a hash of the protected file. The discovery component 202 stores the hash and a policy violation status in a data store associated with the DLP discovery component 202. When the protected file is sent across the client computing system 102, as detected by the DLP agent hooks 216, the DLP agent uses the discovery component 202 to get the policy violation status of the protected file. For example, the protected file can be sent across the client computing system 102 by being saved to an external device (e.g., USB disk drive), sent over the network 103, sent as an attachment to an email using an email application, sent using a FTP application, a browser, or the like. The DLP agent hooks 216 employ hooking techniques that are used to alter, augment, or monitor behavior of an operating system, an application or other software component by intercepting function calls or messages or events passed between software components. For example, the applications 140 and external device interfaces 150 (illustrated in FIG. 1) may include a DLP agent hook 216 that gets the policy violation status of protected files when sending the protected file to devices outside of the client computing system 102, such as to USB drives, disc drives, and other computing systems. In one embodiment, the DLP discovery component 202 checks the policy violation status of the protected file by comparing the hash of the protected file being transferred with the stored hash of the protected file In another embodiment, the protected file scanning tool 122 can also be used to detect policy violations when the user creates a new protected file. For example, if the user creates a new Microsoft Office® document and encrypts its content using password, when the user saves the file, the file system component 204 is configured to generate a file write event notification for the file monitoring component 206, which triggers the extractor component 208 to extract decrypted data from a running instance of a data object, corresponding to the protected file, from the ROT 212 for the protected file 210. When the file system component 204 receives a close file event, the detection component 214 scans the extracted decrypted data to check for violations of the DLP policy. Alternatively, the detection component 214 can scan the extracted decrypted data in response to other conditions. The detection component 214 creates a hash of the protected file, and stores the hash with a policy violation status of the protected file 210. Then, when the protected file 210 is sent across the computing system 102, the DLP agent uses the discovery component 202 to get the policy violation status for that protected file 210. In general, this system is used to scan encrypted and protected files, which are registered with ROT of the system.

In one embodiment, if many protected files are found to be opened concurrently, DLP agent, using the extractor component 208 can extract the particular data objects from the ROT by keeping track of order in which the protected files are opened for obtaining running instances of data objects, corresponding to the multiple protected files from the lookup table.

In one embodiment, the following algorithm is used to extract text from the Microsoft Office® Word 2007 application:

```
HRESULT hr;
CLSID clsid ;
: :CLSIDFromProgID( L"Word.Application", &clsid );
IUnknown* pUnk = 0;
IDispatchPtr pIDispWord = NULL;
hr = GetActiveObject(clsid, NULL, &pUnk);
if( hr == S_OK )
{
hr = pUnk->QueryInterface(IID_IDispatch, (void**)&pIDispWord ) ;
pUnk->Release( );
CComDispatchDriver spDispWord(pIDispWord);
CComVariant vResult;
CComBSTR bstrText;
DISPID dispidDocuments = 0;
hr = spDispWord.GetIDOfName(L"Documents", &dispidDocuments);
hr = spDispWord.GetProperty(dispidDocuments, &vResult);
CComDispatchDriver spDocuments(vResult.pdispVal);
if (SUCCEEDED(hr) && (spDocuments != NULL))
{
hr = spDocuments.GetIDOfName(L"Count", &dispidDocuments);
spDocuments.GetProperty(dispidDocuments, &vResult);
hr = vResult.ChangeType(VT_I4);
long lCount = vResult.lVal;
for ( longlItem = 1; lItem <= lCount; lItem++ )
{
   CComVariant vtDocument;
   vtDocument.vt = VT_I4;
   vtDocument.lVal = lItem;
   hr = spDocuments.Invoke1(L"Item",&vtDocument, &vResult);
   CComDispatchDriver spDocument(vResult.pdispVal);
   hr = spDocument.GetPropertyByName(L"Content", &vResult);
   CComDispatchDriver spRange(vResult.pdispVal);
   hr = spRange.GetIDOfName(L"Words", &dispidDocuments);
   hr = spRange.GetProperty(dispidDocuments, &vResult);
   CComDispatchDriver spWords(vResult.pdispVal);
   hr = spWords.GetPropertyByName(L"Count", &vResult);
   hr = vResult.ChangeType(VT_I4);
   long lRangeCount = vResult.lVal;
   for( long lRange = 1; lRange <= lRangeCount; lRange++ )
      {
      CComVariant vtRange;
      vtRange.vt = VT_I4;
      vtRange.lVal = lRange;
      hr = spWords.Invoke1(L"Item", &vtRange, &vResult);
      CComDispatchDriver pRange(vResult.pdispVal);
      hr = pRange.GetPropertyByName(L"Text",&vResult);
      hr = vResult.ChangeType(VT_BSTR);
      bstrText = vResult.bstrVal;
      }
   }
 }
}
```

Alternatively, other algorithms may be used to extract data from the data object obtained from the ROT 212.

Figure 3:
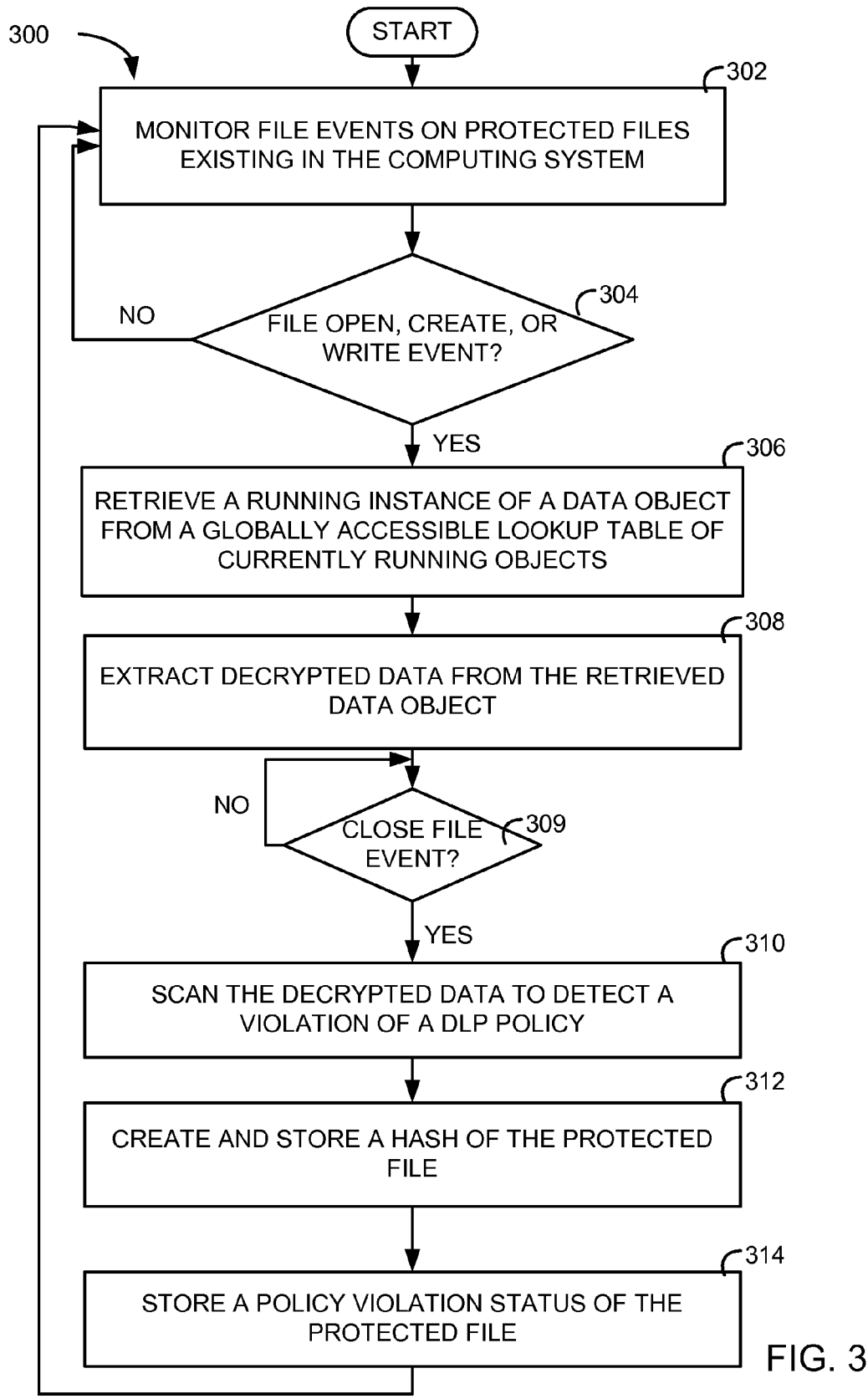
FIG. 3 illustrates one embodiment of a method for scanning protected files.

FIG. 3 illustrates one embodiment of a method 300 for scanning protected files. The method 300 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 300. In another embodiment, the protected file scanning tool 122 of FIG. 1 and FIG. 2 performs the method 300. Alternatively, other components of the client computing system 102 and the server computing system 104 can be configured to perform some or all of the method 300.

Referring to FIG. 3, processing logic begins by monitoring file events on protected files in the client computing system (block 302). In one embodiment, the processing logic creates an inventory of the protected files on the client computing system prior to said monitoring. Next, the processing logic determines if an open file event, a create file event, or a write file event is detected (block 304). If the processing logic detects one of these events, the processing logic obtains a running instance of a data object, corresponding the protected file, from a lookup table (e.g., ROT 212) of currently running objects (block 306); otherwise, the processing logic returns to block 302 to monitor for file events. At block 308, the processing logic extracts decrypted data from the obtained data object (block 308). In one embodiment, the processing logic determines if a close file event is detected at block 309. If at block 309, the close file event is detected, the processing logic scans the decrypted data to detect a violation of a DLP policy (block 310); otherwise, the processing logic waits until the close event file is detected. In another embodiment, the processing logic 309 can scan the decrypted data at block 310 in response to other conditions, such as when a protected file is created, opened, or saved without waiting for the file to be closed.

In one embodiment, the processing logic creates and stores a hash of the protected file (block 312). Creating and storing the hashes is optional, but the hashes could be used for future scanning of files in the client computing system 102 for violations of the DLP policy. At block 314, the processing logic stores a policy violation status of the protected file. The policy violation status can be used by a method for preventing data loss, such as described in connection with FIG. 4.

Figure 4:
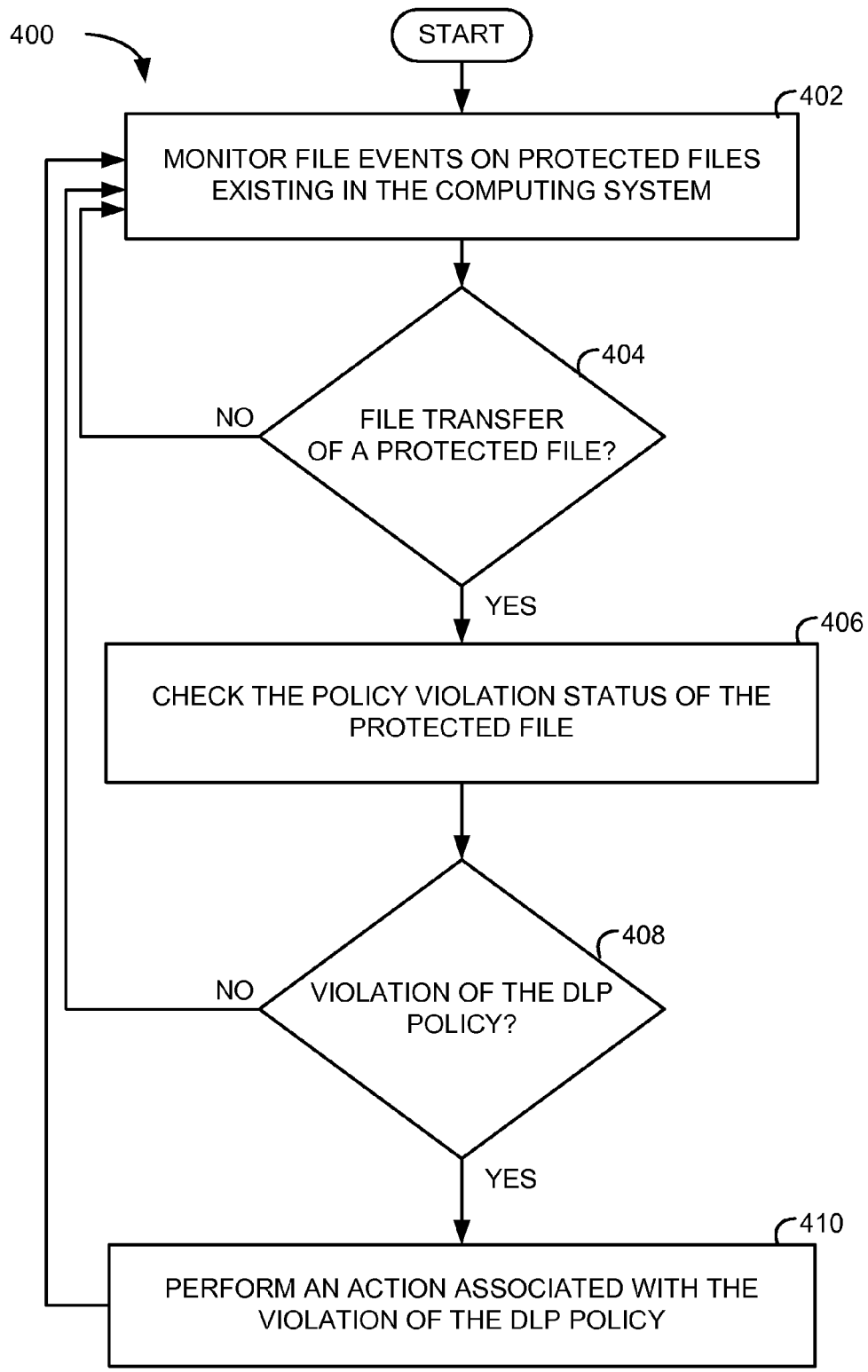
FIG. 4 illustrates one embodiment of a method for preventing data loss in protected files.

FIG. 4 illustrates one embodiment of a method 400 for preventing data loss in protected files. The method 400 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 400. In another embodiment, the protected file scanning tool 122 of FIG. 1 and FIG. 2 performs the method 400. Alternatively, other components of the client computing system 102 and the server computing system 104 can be configured to perform some or all of the method 400.

Referring to FIG. 4, processing logic begins by monitoring file events on protected files in the client computing system (block 402). In one embodiment, the processing logic uses a file-system filter driver (or a file-system mini filter driver) to monitor the file events on the protected files. Alternatively, the processing logic detects the transfer of the file using DLP hooks, such as, for example, in the case of email and FTP applications. When the processing logic detects that a transfer of one of the protected files (block 404), the processing logic checks the policy violation status of the protected file (block 406), such as by comparing the hash of the protected file being transferred with the stored hash of the protected file;

otherwise, the processing logic returns to said monitoring at block 402. At block 408, the processing logic determines if the policy violation status indicates a violation of the DLP policy. If not, the processing logic returns to said monitoring at block 402. If at block 408, the processing logic determines that the protected file violates the DLP policy, the processing logic performs an action associated with the violation of the DLP policy (block 410). In one embodiment where the protected file is being sent as an attachment of an email message, the processing logic's action may be to block the user from sending the email message. The processing logic could also generate a warning to the user that they are about to send a protected file that contains sensitive information that violates the DLP policy. In another embodiment, the processing logic could notify an administrator of the violation to allow the administrator to take remedial action. Alternatively, the processing logic can perform other actions associated with the violation as would be appreciated by one of ordinary skill in the art having the benefit of this disclosure. After performing the action at block 410, the processing logic returns to said monitoring at block 402.

In another embodiment, the processing logic tracks an order in which multiple protected files are opened in order to obtain the respective active instance of the corresponding data objects in the lookup table.

Figure 5:
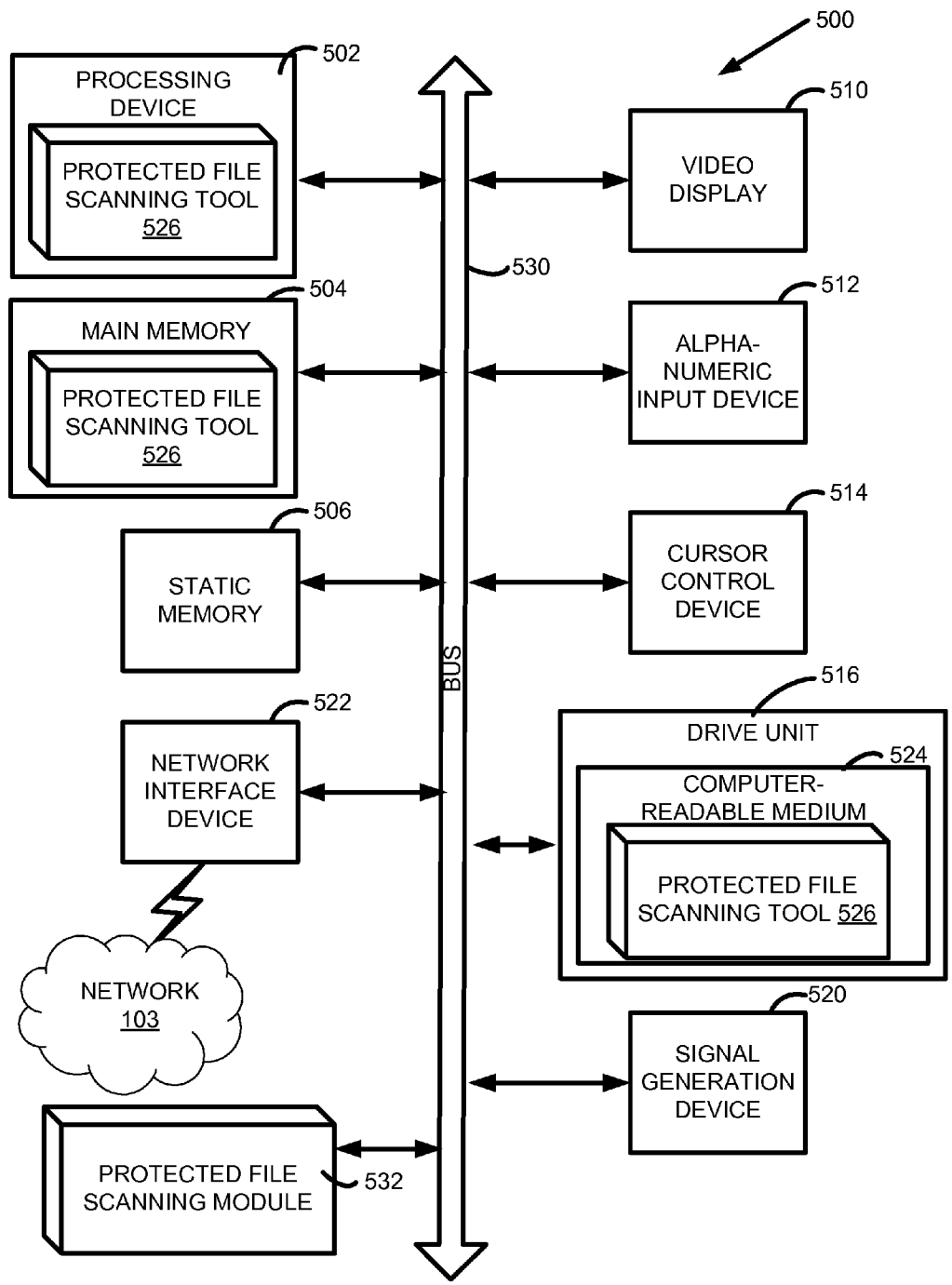
FIG. 5 illustrates a diagrammatic representation of a machine in the exemplary form of a computing system within which a set of instructions, for causing the machine to perform any one or more of the methodologies described herein, may be executed.

FIG. 5 illustrates a diagrammatic representation of a machine in the exemplary form of a computing system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 500 includes a processing device (processor) 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 518, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic for protected file scanning tool 526 for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions (e.g., protected file scanning tool 526) embodying any one or more of the methodologies or functions described herein. The protected file scanning tool 526 may also reside, completely or at least partially, within the main memory 504 and/or within the processor 502 during execution thereof by the computing system 500, the main memory 504 and the processor 502 also constituting computer-readable media. The protected file scanning tool 526 may further be transmitted or received over a network 520 via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The protected file scanning module 532, components, and other features described herein (for example in relation to FIGS. 1, 2A, and 2B) can be implemented as discrete hardware components or integrated in the functionality of hardware components such as ASICS, FPGAs, DSPs, or similar devices. The protected file scanning module 532 may implement operations of protected file scanning as described herein with respect to FIGS. 3 and 4. In addition, the protected file scanning module 532 can be implemented as firmware or functional circuitry within hardware devices. Further, the protected file scanning module 532 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "generating", "sending", "encrypting," "hashing," "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    monitoring, by a processing device of a computing system, protected files in the computing system; and
    when one of the protected files is created, opened, or saved, obtaining, by the processing device, a running instance of a data object, corresponding to the one protected file, from a data store that stores information to track objects that are actively being processed by a currently running application on the computing system; and
    extracting, by the processing device, the decrypted data from the obtained data object; and
    scanning, by the processing device, the decrypted data to detect a violation of a data loss prevention (DLP) policy;
    creating a hash of the one protected file;
    storing the hash and a policy violation status of the one protected file;
    detecting a transfer of the one protected file;
    checking the policy violation status of the one protected file; and
    performing an action when the policy violation status indicates that the one protected file violates the DLP policy.

2. The method of claim 1, wherein said monitoring comprising monitoring for file events on the protected files in the computing system using a file-system filter driver, wherein the file events comprise at least one of a create file event, an open file event, a write file event, or a close file event.

3. The method of claim 1, wherein said monitoring comprises detecting that an application executing on the computing system has opened, created, or saved one of the protected files.

4. The method of claim 1, further comprising tracking an order in which a plurality of the protected files are opened for obtaining running instances of data objects, corresponding to the plurality of protected files from the data store.

5. The method of claim 1, wherein said monitoring comprises creating an inventory of the protected files on the computing system.

6. A non-transitory computer readable storage medium including instructions that, when executed by a processing device of a computing system, cause the processing system to perform operations comprising:
    monitoring, by the processing device, protected files in the computing system;
    when one of the protected files is created, opened, or saved, obtaining, by the processing device, a running instance of a data object, corresponding to the one protected file, from a data store that stores information to track objects that are currently running on the computing system; and
    extracting, by the processing device, decrypted data from the obtained data object; and
    scanning, by the processing device, the decrypted data to detect a violation of a data loss prevention (DLP) policy;
    creating a hash of the one protected file;
    storing the hash and a policy violation status of the one protected file;
    detecting a transfer of the one protected file;
    checking the policy violation status of the one protected file; and
    performing an action when the policy violation status indicates that the one protected file violates the DLP policy.

7. The computer readable storage medium of claim 6, wherein said monitoring comprising monitoring for file events on the protected files in the computing system using a file-system filter driver, wherein the file events comprise at least one of a create file event, an open file event, a write file event, or a close file event.

8. The computer readable storage medium of claim 6, wherein said monitoring comprises detecting that an application executing on the computing system has opened, created, or saved one of the protected files.

9. The computer readable storage medium of claim 6, wherein the method further comprises tracking an order in which a plurality of protected files are opened for obtaining running instances of data objects, corresponding to the plurality of protected files from the data store.

10. The computer readable storage medium of claim 6, wherein said monitoring comprises creating an inventory of the protected files on the computing system.

11. An apparatus, comprising:
    a data storage device to store a data store that stores information to track objects that are currently running on a computing system; and the computing system, coupled to the data storage device, to execute a data loss prevention (DLP) agent, wherein the DLP agent comprises:
  a file system component to monitor file events on protected files in the computing system, wherein the file events comprise at least one of a create file event, an open file event, a close file event, or a write file event;
  a file monitor component to monitor whether applications executing on the computing system have created, opened, closed, or saved one of the protected files;
  an extractor component to obtain a running instance of a data object, corresponding to the one protected file, from a data store that stores information to track objects that are currently running on the computing system, and wherein the extractor component is to extract decrypted data from the obtained data object; and
  a detection component to scan the decrypted data to detect a violation of a DLP policy;
  a discovery component to create a hash of the protected file, and to store the hash and a policy violation status of the protected file, wherein the discovery component is further to:
    detect a transfer of the one protected file;
    check the policy violation status of the one protected file; and
    perform an action when the policy violation status indicates that the one protected file violates the DLP policy.

12. The apparatus of claim 11, wherein the detection component is to scan the decrypted data when the file system component receives a close file event for the protected file.

13. The apparatus of claim 11, wherein the file system component comprises a file-system filter driver to monitor the file events.

14. The apparatus of claim 11, wherein the discovery component is to create an inventory of the protected files on the computing system.

15. The apparatus of claim 11, wherein the file system component is to generate a file open event when a user of the computing system creates a new protected file, and wherein the extractor component is to receive the file open event from the file system component and to extract the decrypted data in response to receiving the file write event.

* * * * *